United States Patent [19]

Doll

[11] Patent Number: 4,554,828

[45] Date of Patent: Nov. 26, 1985

[54] MEASURING DEVICE FOR THE MAGNETO-INDUCTIVE MEASURING OF THE FLOW RATE OF A LIQUID MEDIUM

[75] Inventor: Friedhelm Doll, Wermelskirchen, Fed. Rep. of Germany

[73] Assignee: Turbo-Werk Messtechnik GmbH, Cologne, Fed. Rep. of Germany

[21] Appl. No.: 537,647

[22] Filed: Sep. 30, 1983

[30] Foreign Application Priority Data

Oct. 6, 1982 [DE] Fed. Rep. of Germany ....... 3236909

[51] Int. Cl.⁴ ............................ G01F 5/00; G01F 1/58
[52] U.S. Cl. .................................... 73/202; 73/861.12
[58] Field of Search .................... 73/181, 202, 861.12, 73/861.15

[56] References Cited

U.S. PATENT DOCUMENTS

| 3,734,083 | 5/1973 | Kolin | 73/861.12 |
| 3,929,016 | 12/1975 | Takeuchi | 73/861.12 |
| 4,175,566 | 11/1979 | Millar | 73/861.12 |
| 4,236,410 | 12/1980 | Appel et al. | 73/861.12 |
| 4,459,858 | 1/1984 | Marsh | 73/861.12 |

FOREIGN PATENT DOCUMENTS 1279529 11/1961 France ............................ 73/861.12

Primary Examiner—Herbert Goldstein
Attorney, Agent, or Firm—Spensley Horn Jubas & Lubitz

[57] ABSTRACT

A device for the magneto-inductive measuring of the flow rate of a liquid medium is disclosed wherein a cylindrical probe is immersed in a tube or in an open channel. The probe contains a cylindrical measuring channel through which flows the fluid to be measured. The probe includes a coil, which generates a magnetic field that extends through the measuring channel and whose axis is normal to the direction of fluid flow. Electrodes are mounted on the wall of the measuring channel, from which a voltage may be taken that is proportional to the flow rate of the fluid.

8 Claims, 5 Drawing Figures

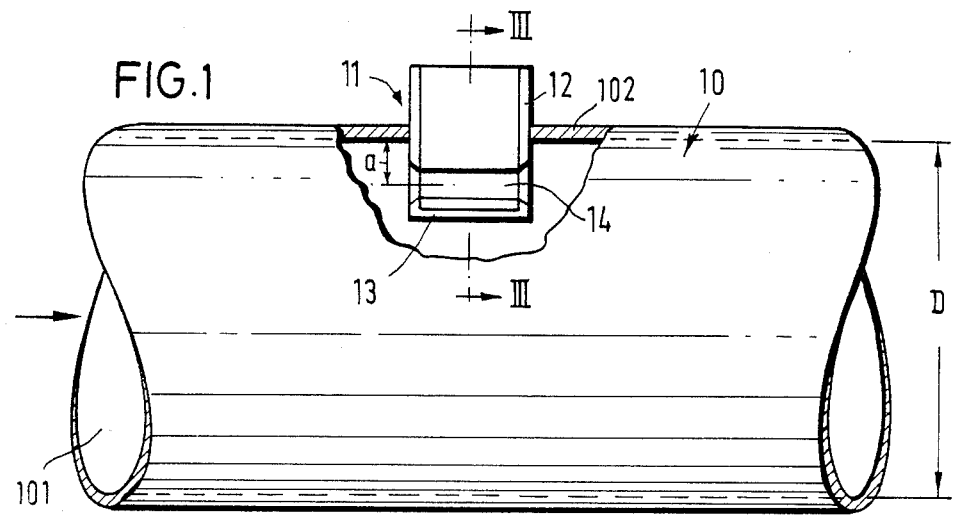
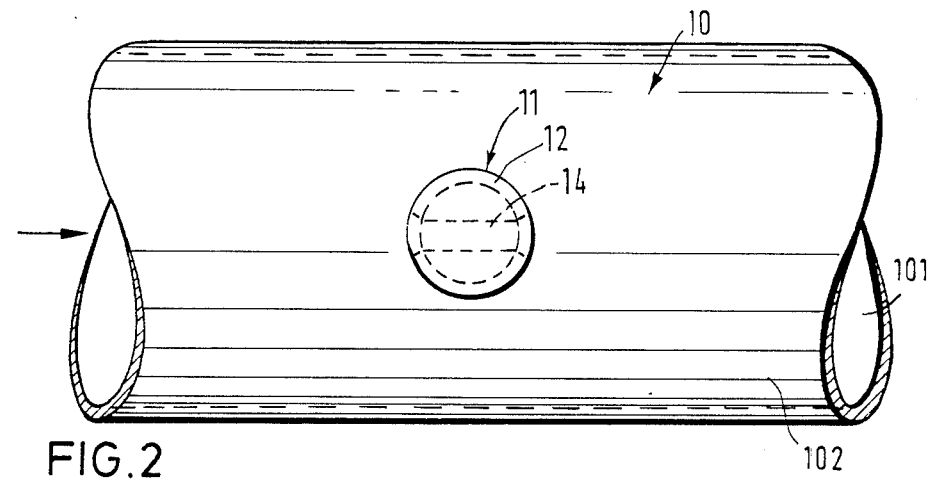

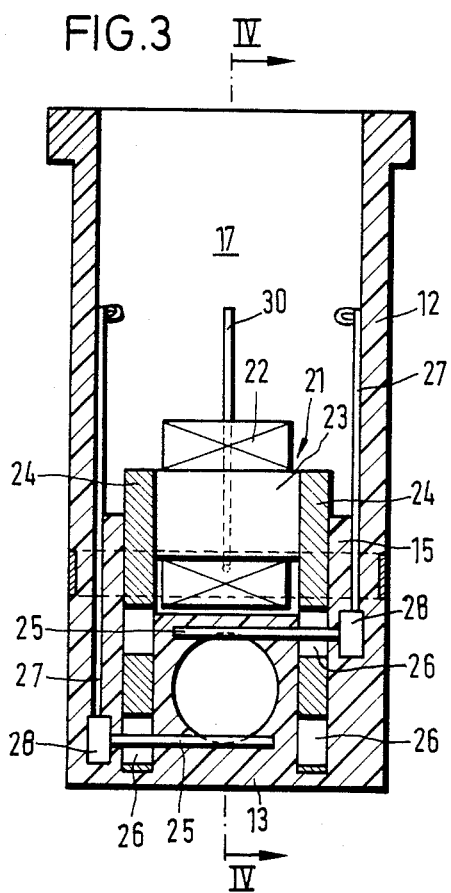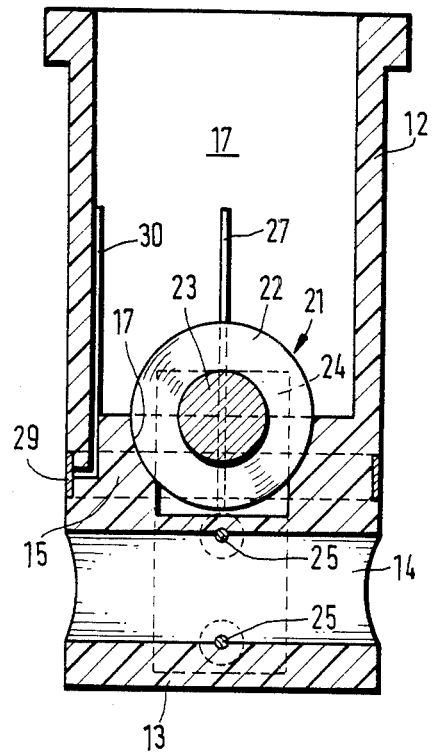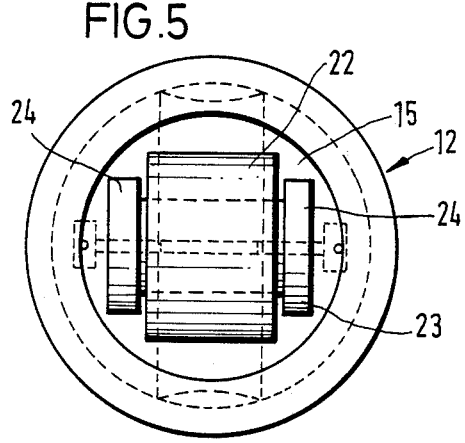

MEASURING DEVICE FOR THE MAGNETO-INDUCTIVE MEASURING OF THE FLOW RATE OF A LIQUID MEDIUM

The invention relates to a measuring device for the magneto-inductive measuring of the flow rate of liquid media in a flow channel of a tube having a closed cross section or of a groove having an open cross section comprising a probe extending into the fluid and containing a continuous measuring channel, the probe including an electromagnet having a coil generating a magnetic field in the measuring channel, and at least two electrodes arranged at the wall of the measuring channel within the reach of the magnetic field.

It has been known to measure the flow rate and the throughput accordingly of conductive fluids in closed, filled pipe lines with the aid of magneto-inductive flow meters (MID). Such flow meters comprise a electromagnet which generates a magnetic field in the pipe or channel. By the movement of the conductive elements contained in the fluid in a direction transverse direction to the magnetic field, there is formed an electric field whose field intensity or electric voltage can be measured thus giving a parameter for the flow speed or rate of flow. It is advantageous that such measuring devices cover the total flow cross section of the pipe or channel. However, in particular in case of large flow cross sections, the respective magnets required are large, heavy and expensive. Their dimensions must be considerable and in case of large flow cross sections, a strong magnetic field involving a corresponding current consumption is necessary.

To avoid these disadvantages, there have been known measuring devices in which only a partial flow of the fluid is subjected to measurement. Starting from the partial flow, the total throughput is determined. The structure of the known probes is open, that is, they use a body having a low flow resistance and including a magnet whose magnetic field extends from one point of the casing into the free space. At the outside of the body, there are mounted electrodes to measure the electric field intensity or voltage generated in the fluid. A disadvantage of this type of device is that the magnetic field emerging from the casing is widely scattered due to the wide-open magnetic circuit, thus resulting in a weak magnetic field intensity and in a relatively weak useful signal which can be evaluated but with difficulty. Moreover, eddy currents are formed at the points where the casing is dipped into the flow which additionally affect the measurement by rendering it unreliable. Another disadvantage of such open probes resides in the fact that adjacent metal particles influence the magnetic or electric field and the useful signal accordingly. Furthermore, in connection with the flow about a probe body, which flow is dependent upon the Reynolds number, relatively great errors of linearity are caused.

There has been also known an inductive flow meter of the above mentioned type which comprises a supporting arm secured to the wall of the flow channel and at which a thin-walled ring of insulated material that is aligned coaxially to the flow channel is provided. In the wall of the ring, exciting coils of the electromagnet are embedded which generates inside the ring a magnetic field. In addition, electrodes are fixed at the ring wall to measure the field intensity or voltage generated in the electric field. However, with the known flow meter, a considerable magnetic stray field is produced outside the ring. The ring being in the center of the flow channel, holder and ring protrude far into the flow and, in spite of the thin-walled design of the ring, a considerable disturbance of the flow profile is caused. The greatest disadvantage of such a probe is its basic concept, which is hardly realisable in practice for incorporating a probe substantially consisting of a thin-walled tube which is exposed to the flow. As a matter of fact, to generate a magnetic field which is to take up said "tube in the tube", the required electromagnet must be so large as to hardly allow the realisation of a probe in the form of a thin-walled tube.

It is the object of the present invention to provide a measuring device of the type dealt with at the outset hereof in which the electromagnet generates a stray field as reduced as possible and which, in connection, with a compact construction permits to effect accurate measurements.

To achieve these objects and solve problems associated with the prior art, it is provided according to the invention, that the measuring channel extends transversely through a casing projecting from the wall of the flow channel into the latter, that the measuring channel is provided near the wall of the flow channel, and that the electromagnet mounted inside the casing comprises a core passing through a coil whose pole members are provided at both sides of the measuring channel.

According to the invention, a measuring channel extends transversely through a casing which is dipped into the flow channel, the casing being hollow to permit housing of the electromagnet with the coil arranged transversely above the measuring channel. The electromagnet is provided with an iron core whose pole members are fitted at the sides of the measuring channel. By this means, the magnetic field is concentrated inside the measuring channel, thus excluding practically the formation of a stray field outside thereof. As a result, the electromagnetic may be of a relatively small design with a reduced power requirement. On the other hand, the interference of the casing with the flow is relatively negligeable because the casing does not extend to the center of the flow channel but it is provided at the border only. While the prior art measuring channel consists of a thin ring mounted at a narrow holder, the invention makes use of a casing which does not protrude deeply into the flow channel, the measuring channel being a bore through the casing. The casing length inside the flow channel should not exceed $\frac{1}{4}$, preferably not 1/6 of the diameter of the fluid flow channel. Thus, the flow is slightly affected only. On the other hand, the electric and magnetic components which are required for the flow measurement, are compactly arranged inside the closed casing projecting like a rod into the flow channel.

According to a preferred embodiment of the invention, the measuring channel is spaced from the flow channel wall at a distance which is about $\frac{1}{8}$ of the diameter of the fluid flow channel. In an unobstructed flow channel, a certain flow profile is formed. For instance, the rate of flow is very low near the border, while it increases towards the center. At a distance of D/8 from the flow channel wall, D being the diameter of the flow channel, the flow vector corresponds to the average rate of flow over the total cross section, practically irrespective of the Reynold number. The shape of the probe (cylinder with transverse bore as measuring channel) now permits it to determine the flow vector at the point D/8 from the tube wall in such a way that the flow vector is measured in a manner unaffected and not influenced by the probe body. It is a peculiarity of the construction that the flow vector prevailing in the measuring channel is not falsified or changed by the cylindrical casing dipped into the flow.

In a preferred embodiment of the invention, the casing comprises a plastic body being transversed by the measuring channel and pole members of the electromagnet being embedded at both sides of the measuring channel in the plastic body. Such a probe can be easily produced and does not require tubes or other fluid conduits. The pole members are embedded in the plastic body at both sides of the measuring channel to ensure that they are situated as near as possible at the measuring channel although they do not contact the flowing fluid.

Preferably, the width of the casing transversely to the flow direction and over the total length of the casing dipped into the flow channel is not smaller than in the region of the measuring channel. The width of the casing may increase from the measuring channel to the wall of the flow channel thus resulting in a conical design of the casing and involving a selfcleaning effect. If dirt or objects are taking hold at the casing, a force component is produced by the flow towards the casing end, thus causing the particles or objects to slide off the casing.

Instead of one sole probe, use can be made of several probes provided at different points of the flow channel to measure the flow rates at different points and to determine average rate of flow by taking the mean.

With reference to the drawings, an embodiment of the invention will be explained hereinafter in details.

FIG. 1 is a side view partly broken away to illustrate the probe of a tube passed by an electrically conductive fluid, FIG. 2 is a plan view of FIG. 1, FIG. 3 is a sectional view of the probe along line III—III of FIG. 1, FIG. 4 is a sectional view of the probe along line IV—IV of FIG. 3 and FIG. 5 is a plan view of the probe.

In the illustrated embodiment the flow rate of an electrically conductive fluid flowing in the flow channel 101 of a tube 10 shall be determined. To this effect, a probe 11 protrudes through the wall 102 of the flow channel tube 10 into the inside of the tube. Said probe 11 consists of a cylindrical pot-shaped casing 12 having a closed bottom wall 13. The probe 11 contains a measuring channel 14 extending transversely therethrough and being provided in parallel to the flow direction in tube 10. Only part of the probe length projects into the tube 10. The probe 11 is sealingly mounted in a corresponding aperture in the wall 102 so that no fluid may leak out of the tube 10 at this point of the probe. It is also possible, in an alternative design, to provide the complete probe inside the tube 10.

The center of the measuring channel 14 is spaced from the wall 102 at a distance a which is about ⅛ of the internal diameter D of the flow channel 101. The width of the measuring channel 14 is 1/10 to 1/20 of the width of the flow channel 101.

As evident from FIGS. 3 and 4, the lower portion of the casing 12 is a solid plastic body 15 which comprises a transverse bore forming the measuring channel 14.

The electromagnet 21 contains a coil 22 the axis of which extends at right angles to the measuring channel 14 and the lower semicylindrical half of which rests in a semicylindrical recess 16 in the upper side of the plastic body 15, while the upper coil half projects into the casing cavity 17. By (non-drafted) supply lines the coil 22 is connectable to a current source outside the probe. An iron core 23 of soft-magnetic material extends through the coil 22. As obvious from FIG. 3, the ends of said core 23 abut against plate-shaped pole members 24 embedded in the plastic body 15 at both sides of the measuring channel 14 and facing one another with their end sides. The plastic body 15 is made of polytetrafluoroethylene.

In the area of the measuring channel 14 between the two pole members 24, electrodes 25 are provided at two points diametrically opposite each other in the cross section of the bore 16. Said electrodes 25 which consist of metal rods extending tangentially relative to the measuring channel 14 are projecting into the measuring channel with part of their peripheral surface. One of the parallel electrodes 25 which extend transversely to the measuring channel 14, is directed to the upper horizontal tangent, while the other is provided towards the lower horizontal tangent in regard to the measuring channel 14. Except for their freely exposed surfaces in the measuring channel 14, said electrodes 25 are embedded in the plastic body 15 to extend rectangularly to the pole members 24 through holes 26 in the pole members 24. Inside the plastic body 15 a metal rod 27 is fixed at one end of each electrode 25 by means of a connecting piece 28. The metal rods 27 are conducted out of the plastic body 15 into the cavity 17. Due to their tangential arrangement, the electrodes do not require any additional space. Since they are embedded in and closely surrounded by the material of the plastic body 15 by injection moulding over a large part of their length, the resultant sealing against the leakage of fluid out of the measuring channel 14 is very good.

Above the measuring channel 14 the casing 12 is surrounded by a band-shaped mass electrode 29 which communicates with cavity 17 through a conductor rod 30.

The magnetic field generated by a current which flows in coil 22 is concentrated in the magnetic core 23. The magnetic field lines leaving or entering the facing sides of the pole members 24 are passing transversely through the measuring channel 14, thus forming to a far extent a homogeneous magnetic field extending transversely to the flow direction of the fluid in the measuring channel 14. The conductive elements contained in the fluid produce between the electrodes 25 an electric voltage that is proportional to the velocity of the fluid. The shortest straight line between the uncovered areas of the two electrodes 25 is vertical to the straight line or to the field lines extending between the pole members 24.

I claim:

1. A device for measuring the magneto-inductive flow rate of a flowing liquid medium in a flow channel, comprising:

a probe extending into the flowing liquid medium, said probe containing a continuous measuring channel therethrough, the probe including an electromagnet having a coil generating a magnetic field in the measuring channel, and at least two electrodes disposed at the wall of the measuring channel within the range of the magnetic field, wherein the measuring channel extends transversely through a casing of the probe projecting into the flow channel and wherein said portion of the casing projecting into the flow channel is substantially of cylindrical shape; wherein the measuring channel is substantially of cylindrical shape and is disposed near the wall of the flow channel and wherein the electromagnet is mounted inside the casing and comprises a core that passes through the coil and is affixed to pole members which extend in proximity to both sides of the measuring channel.

2. The device according to claim 1, wherein the measuring channel is spaced from the flow channel wall at a distance of about ⅛ of the diameter of the flow channel as measured between the axial center of the measuring channel and the flow channel wall along a radius of the flow channel.

3. The device according to claim 2, wherein a plurality of like probes are disposed within the flow channel such that their output signals are combined to form a mean or average value.

4. The device according to claim 1, wherein the casing of the probe includes a plastic body being transversed by the measuring channel and wherein the pole members of the electromagnet are embedded within the plastic body.

5. The device according to claim 1, wherein the coil is fitted transversely to and above the measuring channel.

6. A device for measuring the magneto-inductive flow rate of a flowing liquid medium in a flow channel of a tube having a closed cross section or of a groove having an open cross section, comprising a probe extending into the flowing liquid medium, said probe containing a continuous measuring channel therethrough, the probe including an electromagnet having a coil generating a magnetic field in the measuring channel, and at least two electrodes disposed at the wall of the measuring channel within the range of the magnetic field, wherein the measuring channel extends transversely through a casing of the probe projecting into the flow channel;

wherein the measuring channel is disposed near the wall of the flow channel and wherein the electromagnet is mounted inside the casing and comprises a core passing through the coil and fixed to pole members which extend in proximity to both sides of the measuring channel, respectively, wherein the casing of the probe includes a plastic body being transversed by the measuring channel and wherein the pole members of the electro magnet are embedded within the plastic body at both sides of the measuring channel, and wherein at least one of the electrodes extends tangentially to the periphery of the measuring channel and orthogonally to the axis of the measuring channel, is exposed at a part of the peripheral surface of the measuring channel while a substantial part of the length of the electrode is sealingly embedded in the plastic body.

7. The device according to claim 6, wherein at least one of the pole members contains a hole for the passage of the electrode therethrough.

8. A device for measuring the flow rate of a liquid medium flowing through a flow channel without significantly disrupting the flow, comprising:

a probe of cylindrical cross-section having a transverse non-nozzle shaped, non-constricted cylindrical measuring channel therethrough, said measuring probe projecting into said flow channel such that the measuring channel is at a distance of $D/8$ from the wall of said flow channel, where D is the diameter of the flow channel, means within said probe for producing a magnetic field transverse to but encompassing said measuring channel, and electrodes on opposite sides of said measuring channel transverse to said magnetic field, the voltage produced across said electrodes by fluid flow through said measuring channel being indicative of the flow rate through said flow channel, the value of said flow rate determined at said $D/8$ distance being indicative of the average flow rate across the entire flow channel, said cylindrical casing shape enabling linear measurement of said flow rate notwithstanding the presence of said probe within said flow channel.

* * * * *